Patented Dec. 1, 1931

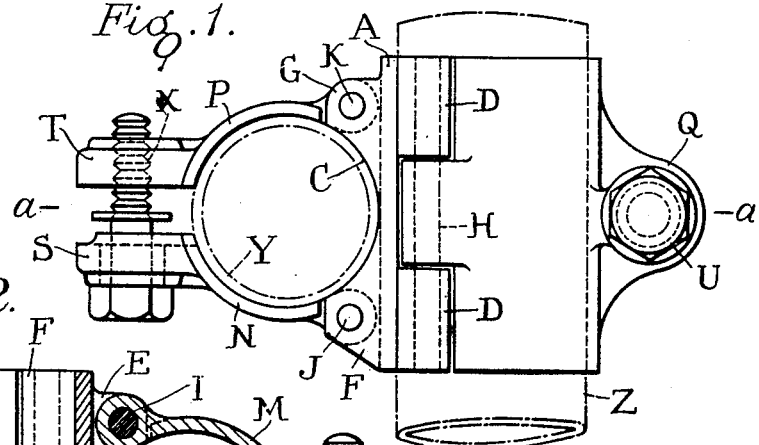
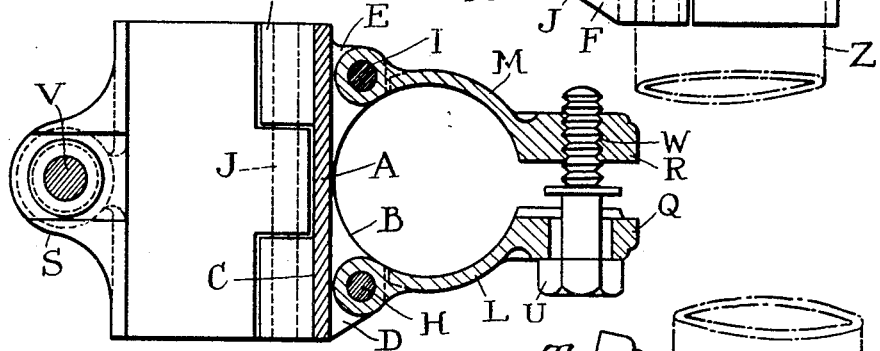
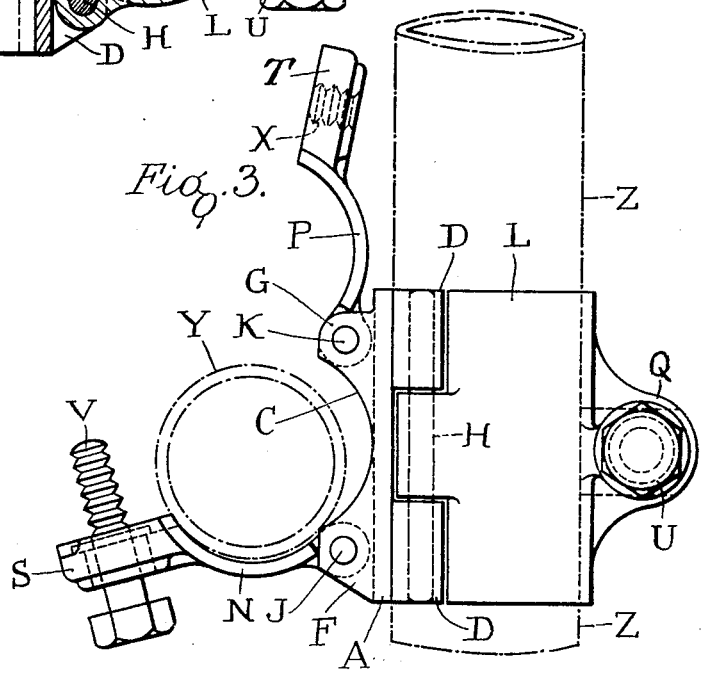

1,834,838

UNITED STATES PATENT OFFICE

THOMAS PROSSER HINGLEY, OF LONDON, ENGLAND

COUPLING OR CLAMP FOR SCAFFOLDING OR OTHER PURPOSES

Application filed November 6, 1930, Serial No. 493,850, and in Great Britain December 7, 1929.

This invention relates to that class of coupling or clamp for use in securing, in angular relationship to each other, two rods or tubes now employed in removable scaffolding. Couplings or clamps of this class have been proposed which comprise a block having a substantially semi-cylindrical recess on each of its sides, the recess at one side of the block being at a right angle to that at the other side of the block and each recess being covered by a semi-cylindrical cap hinged to the block at one side and bolted to the block at the other side after engagement of the rod or tube so as to grip and hold the rod or tube firmly to the block.

Now the object of this invention is to construct a coupling or clamp of the class specified in an improved manner and whereby a rod or tube can be more easily connected to the block or body.

For the purpose of my invention, instead of providing a single hinged semi-cylindrical cap for each recess in the block I provide two pairs of complemental arcuate caps and provide the caps of each pair with means to secure them together. The block has an arcuate recess on each of its sides, formed by portions projecting from the block and serving as lugs to which the arcuate caps are hinged, the recess at one side of the block being at a right angle to the recess at the opposite side of the block. One cap on each side of the block is so constructed that, when opened out, it can rest against the lug portion to which it is hinged without necessitating any projections on the lug or cap.

My invention will be clearly understood from the following description aided by the annexed drawings in which:—

Figure 1 is a side elevation of my coupling or clamp in the closed condition, the clamp being shown as gripping a vertical tube and a horizontal tube, both of such tubes being shown in broken lines.

Figure 2 is a section of the coupling or clamp on section line a a of Figure 1.

Figure 3 is a view similar to Figure 1, but showing the two arcuate caps on one side of the block open and with the horizontal tube resting on the lower one.

According to this invention, A is the block having arcuate recesses B, C one on each side of the block and arranged at a right angle to one another, the recessed portions being formed by pairs of aligned projections forming lugs D, E, F, G having holes for containing hinge pins H, I, J, K. To each pair of aligned lugs I hinge an arcuate cap L, M, N, P, by means of an apertured projection formed on such cap, each of said projections being positioned between a pair of said aligned lugs. The arcuate caps L, M, N and P each has an extension or lip, designated in the drawings as Q, R, S and T, respectively.

Bolts U and V extending, respectively, through the openings in the extensions or lips Q and S and engaging, respectively, screw-threaded openings W and X in the extensions or lips R and T, serve to draw the complemental arcuate caps L, M and N, P together and toward the arcuate recesses B and C of the block A to firmly grip the rod or tube Y or Z and hold it in position.

One cap of each complemental pair, preferably the one carrying the bolt U or V, is so constructed and hinged that, when opened out, it can rest against the lugs D, F without any projections thereon or on the cap, and, if such cap be the lower one to support a horizontally positioned rod or tube it will form a temporary support for the rod or tube during erection of the scaffolding, as will be understood from Figure 3.

What I do claim as my invention and desire to obtain by Letters Patent is:—

A coupling or clamp for securing together in angular relationship two metal tubes or rods employed in removable scaffolding, comprising a block having two pairs of aligned arcuate lugs projecting from its opposite sides, the lugs at one side of the block being disposed at a right angle to those at the other side and the lugs at each side of the block forming an arcuate recess, two pairs of complemental arcuate caps, the caps of each complemental pair being hinged, respectively, between a pair of aligned lugs of the block on each side of the latter to coact together and means on the caps for securing them to the tube or rod, one cap of each pair being adapted, when opened out, to rest against the lugs between which it is hinged and act as a support to a rod or tube.

In testimony whereof I have hereunto set my hand.

THOMAS PROSSER HINGLEY.